United States Patent [19]
King et al.

[11] 3,864,211
[45] Feb. 4, 1975

[54] REMOVABLE UPPER TIE PLATE

[75] Inventors: Lloyd L. King, Benton City; Robert K. Marshall, Richland, both of Wash.

[73] Assignee: Exxon Nuclear Company, Inc., Richland, Wash.

[22] Filed: Oct. 2, 1972

[21] Appl. No.: 294,213

[52] U.S. Cl.................... 176/78, 176/76, 24/221 R, 287/20 R, 287/DIG. 8, 287/DIG. 9
[51] Int. Cl................................................ G21c 3/32
[58] Field of Search ........ 176/76, 78, 87; 287/20 R, 287/103 A, DIG. 8, DIG. 9; 151/27, 19; 85/5; 24/221 R, 221 S, 221 K

[56] References Cited
UNITED STATES PATENTS

| | | | |
|---|---|---|---|
| 1,762,776 | 6/1930 | Gardner | 287/DIG. 8 |
| 2,599,207 | 6/1952 | Spahr et al. | 85/5 P X |
| 3,261,070 | 7/1966 | Abolins | 24/221 R |
| 3,382,153 | 5/1968 | Bigge et al. | 176/78 X |
| 3,431,170 | 3/1969 | Lass et al. | 176/78 |
| 3,471,186 | 10/1969 | Luebbert et al. | 287/20 X |
| 3,487,512 | 1/1970 | Marosy | 24/221 R |
| 3,606,406 | 9/1971 | Walters | 287/20 R |
| 3,741,868 | 6/1973 | Qurnell et al. | 176/78 |

FOREIGN PATENTS OR APPLICATIONS

928,506   12/1947   France ......................... 287/103 A

*Primary Examiner*—Carl D. Quarforym
*Assistant Examiner*—Roger S. Gaither
*Attorney, Agent, or Firm*—Harold N. Wells

[57] ABSTRACT

In a nuclear power reactor fuel bundle assembled by tie rods extending between the upper and lower tie plates, the upper tie plate is secured by pre-indexed locking cams which are adjustably fitted to the upper ends of the tie rods and which lock into seats machined into the body of the upper tie plate. During assembly of the fuel bundle, the cams are forced through internal passageways in the tie plate which rotate the cams into a position from which they may enter their respective seats, urged by torsion springs fitted onto the tie rods. Compression springs around the fuel rods hold the tie plate in position by maintaining the cams in their seats. The construction facilitates the disassembly of the fuel bundle for removal of defective or spent fuel rods and permit their replacement under remotely controlled conditions.

6 Claims, 7 Drawing Figures

PATENTED FEB 4 1975

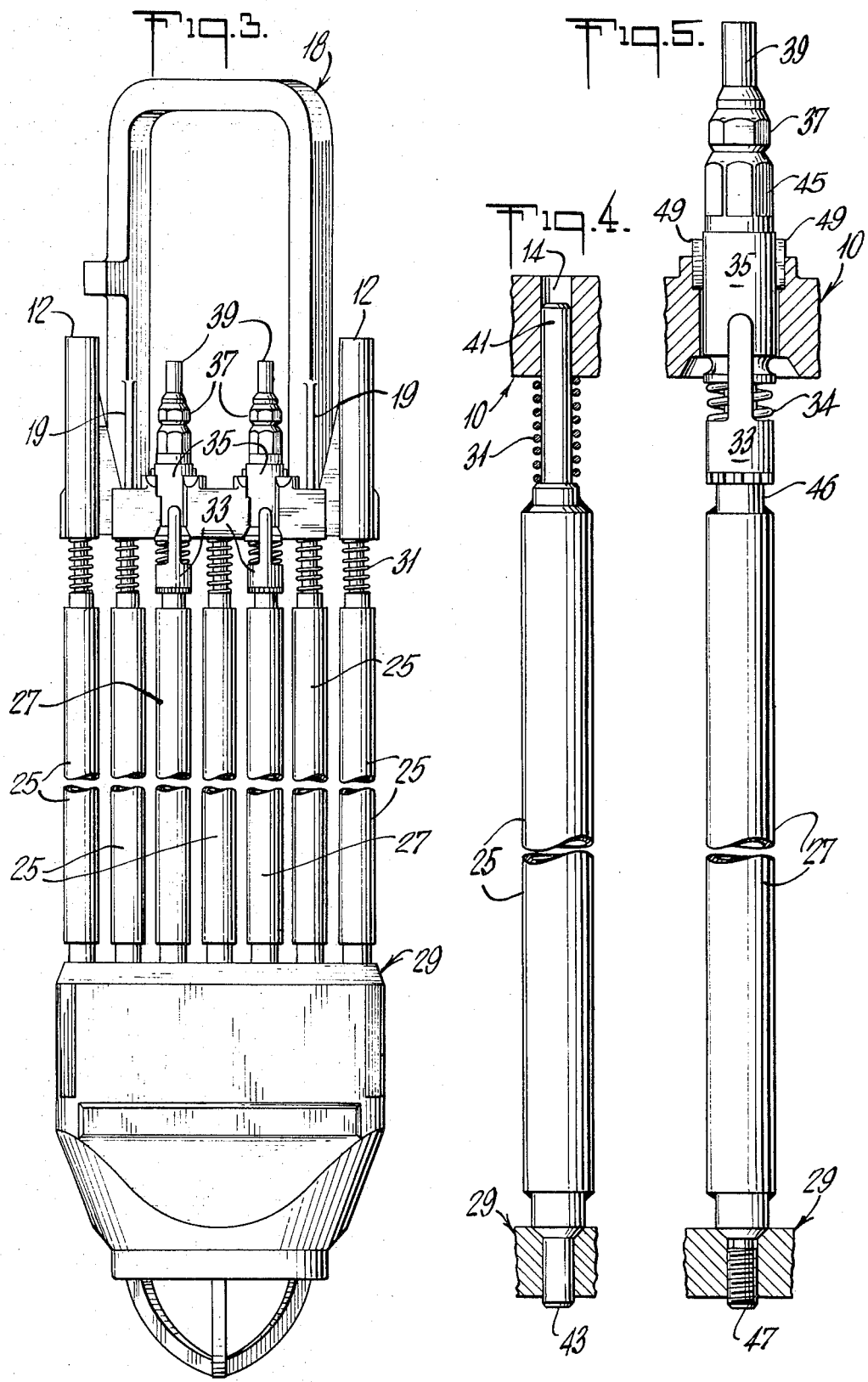

REMOVABLE UPPER TIE PLATE

BACKGROUND OF THE INVENTION

The present invention relates to nuclear power reactor fuel bundles. More particularly, it discloses a method and apparatus for assembly and disassembly of such fuel bundles.

The production of power from nuclear fission may be accomplished in several ways. A common means being by what is known as a boiling water reactor. In such reactors, the heat generated by nuclear fission is removed by boiling water, thereby producing steam which is sent to a turbine which drives an electrical generator. After passing through the turbine and thereafter being condensed, the water is recycled to the reactor where it is boiled again. Such a cycle is broadly analogous to conventional steam boiler plants but with, of course, many problems unique to the operation in which heat is supplied by nuclear fission. In boiling water reactors, the fission occurs within so-called "fuel rods" which are assembled into bundles, a multiplicity of which are located in the fuel core of the reactor. Water surrounds each of said bundles and rods, boiling as heat it is inputted from nuclear fission. As the reactor operates, the fuel is gradually consumed and it is necessary at periodic intervals to replace the fuel.

In order to operate the reactor under optimum conditions, only a minor fraction of the fuel bundles are replaced at any one time. Occasionally, a failure of a bundle occurs which permits radioactive materials to enter the water and the fuel bundles must be replaced. Due to the hazardous raidioactivity, the bundles must be disassembled and repaired by remote control, requiring that the fuel bundles be readily adaptable to remote disassembling. In the prior art (see U.S. Pat. No. 3,431,170) it has been common for fuel bundles to be assembled from groups of fuel rods spaced and suspended between tie plates which act to fix the fuel rods in position relative to each other. In order to minimize thermal expansion difficulties under the high operating temperatures at which the boiling reaction occurs and at the same time to minimize the disassembling problem, fuel rods commonly "float" between the tie plates, having a projection at each end which fits into a corresponding hole in the tie plates. A coil spring surrounds one end of each fuel rod and they are held in place under compression against the tie plate. The tie plates are secured against the pressure of the springs by so-called "tie-rods" which hold the assembly together. These have commonly been threaded at one end into the bottom tie plate and then passed through an opening in the upper tie plate where the tie rod is secured by a nut bearing on the upper tie plate. Locking devices such as are mentioned in the above-referenced patent have been used in order to prevent the nuts from loosening in service and to assure that the fuel bundles remain intact until it is desired to disassemble them. As will be appreciated, the use of a nut and bolt inherently complicates the remotely controlled disassembling process, and it is the object of the present invention to provide an alternative means for assembling nuclear fuel bundles which does not involve the use of such fasteners.

SUMMARY OF THE INVENTION

An improved fuel bundle for nuclear power reactors utilizing conventional construction, but with the addition of preindexed locking cams adjustably fitted to the upper ends of the tie rods which lock into seats machined into the body of the upper tie plate. During assembly of the fuel bundle, the cams are forced through internal tie plate passageways which cause the cams to be rotated into a position from which they may enter their respective seats. The rotation of the cams is resisted by torsion springs. When the lower surface of a cam clears the projection at the entrance to its seat, the torsion spring rotates the cam from the internal passageway into the seat. Compression springs associated with the fuel rods push the tie plate up until the cams are fully secured within the seats. Proper positioning of the cams relative to the tie plate is made before the upper tie plate is installed by means of an indexing device. An antirotation projection is provided in order to prevent the tie rods from becoming unscrewed from the lower tie plate after assembly. Once the tie plate is in position, it is secured by installing a crimping sleeve at the upper end of each tie rod.

Disassembly is obtained by a reverse procedure, that is, depressing the tie plate until the locking cam is above the projection which prevents rotation, rotating the cam until the cam is in the passageway adjacent to the seat, locking the cam device, and lifting up on the tie plate.

BRIEF DESCRIPTION OF THE DRAWINGS

FIG. 3 is an elevation view of an assembled nuclear fuel bundle incorporating the disclosed invention.

FIG. 4 illustrates a typical fuel rod.

FIG. 5 illustrates a typical tie rod.

DESCRIPTION OF THE PREFERRED EMBODIMENT

Figure 1:
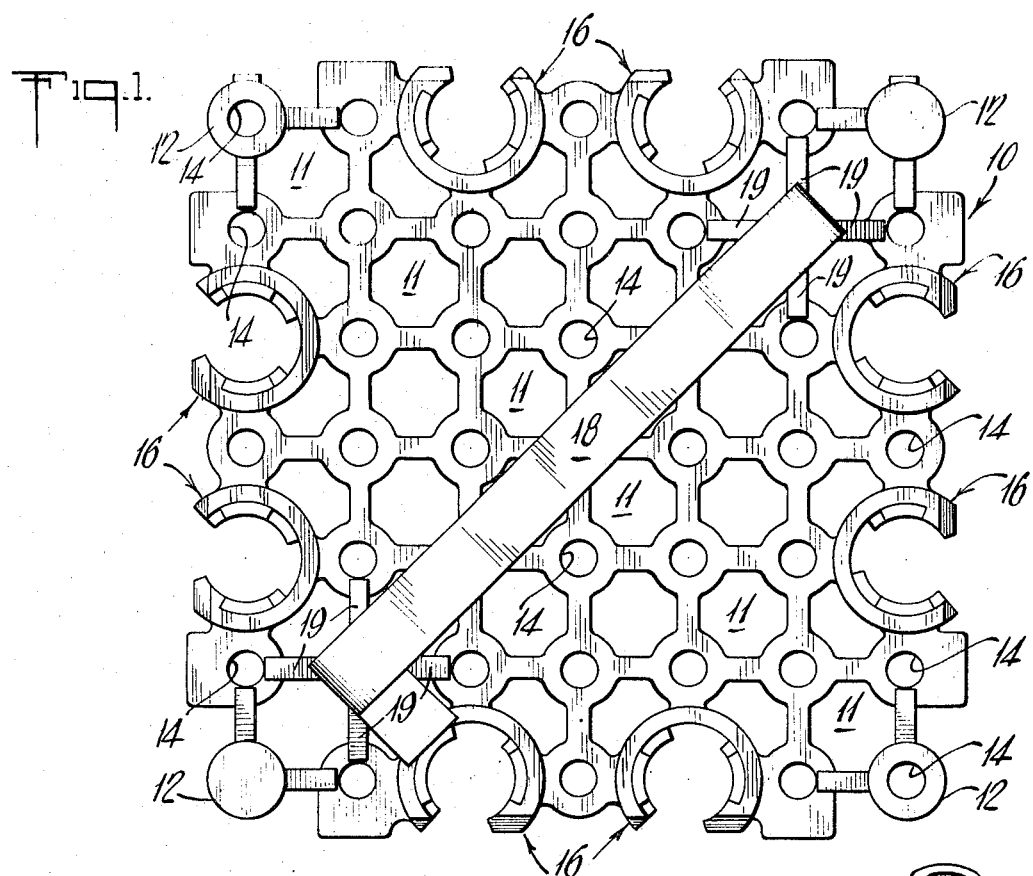
FIG. 1 shows a plan view of an upper tie plate ready for assembly into a nuclear reactor fuel bundle.

In FIG. 1, the upper tie plate is generally shown as 10. It contains openings 14 which receive the fuel rods when the fuel bundle is assembled. The fuel rods are not secured but are free to move slightly within openings 14. Water flows around each fuel rod and boils as it receives heat from the nuclear reaction, and then passes out of the bundle through passageways 11 located between the fuel rod openings 14. A group of fuel rods, in this embodiment a maximum of 41, are assembled into a single bundle and secured by the upper and lower tie plates. The bundle is held together by tie rods which pass through and are secured to raised bosses in the casting generally designated 16. The means for securing the tie rods to the bosses 16 is the principal subject of the present invention. The fuel rods at the corners of the tie plate 10 pass through openings 14 formed in extended and stiffened corner supports 12. The tie plate 10 is moved and positioned by means of a handle 18, which is integrally cast into tie plate 10. Where the handle 18 intersects with the tie plate 10, laterally extended stiffeners 19 are provided.

Figure 2:
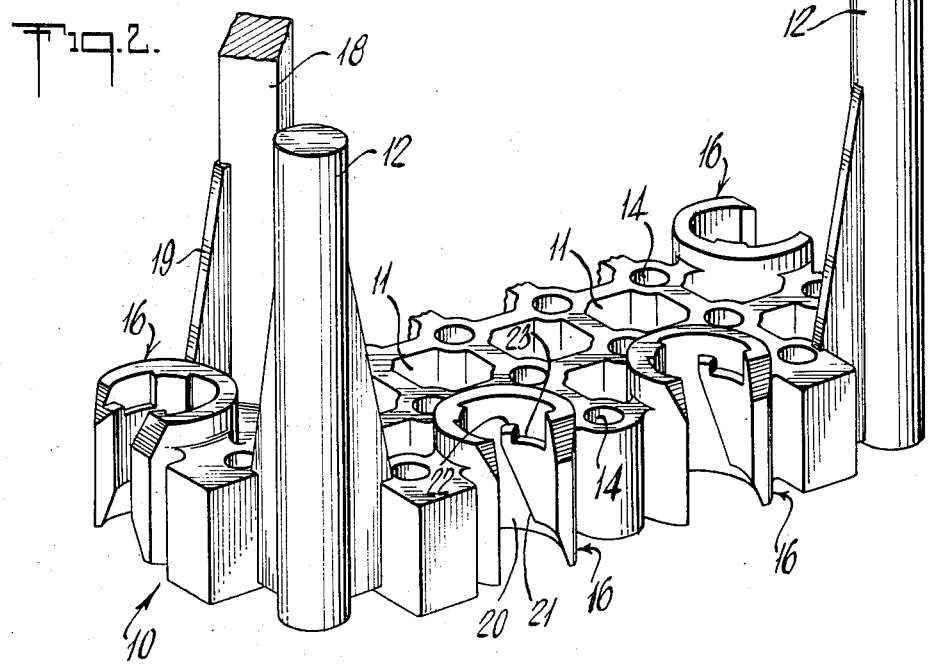
FIG. 2 illustrates a perspective view of a portion of the upper tie plate of FIG. 1.

FIG. 2 shows a portion of FIG. 1 which illustrates the essential features of the upper tie plate, which permit easy assembly and disassembly. In this view four of the eight raised bosses 16 of the upper tie plate are shown. During assembly, tie rods pass up through the bosses 16 and are secured therein by means of the integral features provided, namely the inclined surface 21 of passageway 20, locking projection 22 and cam seat 23. These are machined into the tie plate boss 16 and interact with cams provided on the tie rods, to be discussed more fully later. The tie rods pass through the boss 16, but resist removal after the tie rod has passed through.

In FIG. 3 fuel rods are generally designated as 25 and the tie rods, two of which are shown in partial cut-away view generally as 27. Both the fuel rods 25 and the tie rods 27 are assembled into a lower tie plate structure 29 which need not be discussed in detail inasmuch as it is of conventional construction for purposes of this disclosure. When the bundle is assembled, springs 31 which surround each of the fuel rods are placed in compression. The upward force exerted by springs 31 hold in place the locking mechanism of this invention. The springs also tend to restrict the movement of the fuel rods which "float" between the tie plates. In this view some of the essential features of the tie rod locking mechanism shown include the adjusting sleeve 33, the locking sleeve 35, the adjusting nut 37 and the crimping sleeve 39. The function of these elements will be apparent from the description of the figures which follows.

FIG. 4 illustrates a typical fuel rod which is supported by the lower tie plate 29 and has end caps 41 and 43 which pass into openings in the upper and lower tie plates, 10 and 29. The rod is free to move as constrained by the tie plates and will move longitudinally as its temperature changes due to thermal growth. Spring 31 which surrounds the upper end cap 41 of the fuel rod is confined between a shoulder of the upper end cap 41 and the upper tie plate 10, and, as stated previously, is placed in compression by the assembly of the bundle.

FIG. 5 shows a typical tie rod 27 in assembled condition. The tie rod 27 is threaded by means of its lower end cap 47 into the upper tie plate 29. Once the tie rods are assembled into the upper tie plate 10, the bundle itself is completely secured. Although eight tie rods are shown in this embodiment, another number obviously may be used if desired. A more complete description will be given subsequently, but in general the portions of the upper end of the tie rod which lock the tie rod into the upper tie plate 10 are the following. The tie rod 27 has attached to its upper end an upper end cap 46. A smaller center spindle portion (not shown) of the end cap 46 passes upward through all of the remainder of the assembly and terminates under the crimping sleeve 39. The locking sleeve 35, the torsion spring 34, and the adjusting sleeve 33 form a single unit when assembled and are positioned on the upper end cap 46 to locate the cams 49 so as to engage their corresponding passageways in the upper tie plate 10. The flats 45 provided on on the locking sleeve 35 are for convenience in positioning during assembly. Cams 49 are provided on the periphery of locking sleeve 35 and as can be seen, they will resist the disassembly of the bundle once they are locked in place in the upper tie plate 10. The effective length of the tie rod is determined by the position of adjusting nut 37, which is threaded onto the spindle portion of the upper end cap 46.

Figure 6:
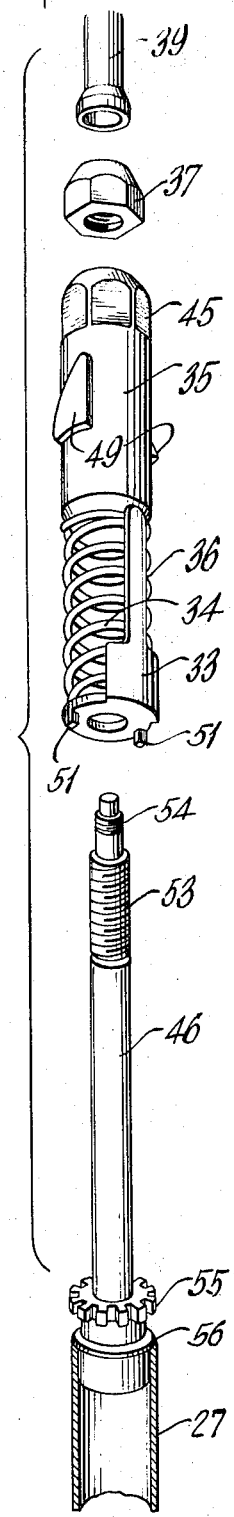
FIG. 6 shows an exploded view of the typical tie rod of FIG. 5.

FIG. 6 shows an exploded view of the upper end of a typical tie rod. The hollow tubular body 27 is sealed at its end by upper end cap 46 which is welded to it along its point of intersection 56. A peripherally slotted disc 55 is provided immediately above in order to secure in proper position the locking sleeve 35 which carries the cams 49. Beyond the disc 55, the upper end cap constitutes a relatively narrower spindle portion having threads 53, which engage adjusting nut 37 and grooves 54 against which sleeve 39 is crimped after the bundle is assembled. It will be remembered that the tie rods are threaded at the bottom. Thus, when they are threaded into the lower tie plate, the position of the cams 49 will almost certainly not be properly aligned relatively to their corresponding passageways in upper tie plate 10. Thus, the locking mechanism has been made adjustable to provide for correct positioning of the cams 49 once the tie rods have been assembled into the lower tie plate. The cams 49 are carried by locking sleeve 35 which is attached to torsion spring 34 which is in turn attached to adjusting sleeve 33. Adjusting sleeve 33 has a pair of downward extending projections 51 which engage the slotted disc 55 which is rigidly attached to each tie rod. The locking assembly (35, 34, and 33) is placed over the spindle portion of the upper end cap 46 until the projections 51 engage the proper slots in disc 55. It is necessary also that the finger-like portion 36 of adjusting sleeve 33 engage the open portion of each of the tie rod bosses 16 in the upper tie plate. Once the cams 49 have been properly aligned, the upper tie plate 10 may be placed over them. By pushing the upper tie plate down against the resistance of springs 31, the cams 49 will be moved along tie plate passageways 21 causing locking sleeves 35 to be rotated as the cams coact with inclined surfaces 21 against the resistance of torsion springs 34 until the cam 49 has passed the projection 22 at the entrance to cam seat 23. Whereupon, the torsion spring 34 will force the locking sleeve 35 to rotate in a reverse direction so that the cams 49 move into the seats 23 (see FIG. 2). The finger-like portion 36 of adjusting sleeve 33 is then in the open space in each boss (see FIG. 2) which prevents rotation until it has been disengaged. Once the bundle has been assembled, additional security against disassembly is obtained by nut 37 and crimping sleeve 39.

Figure 7:
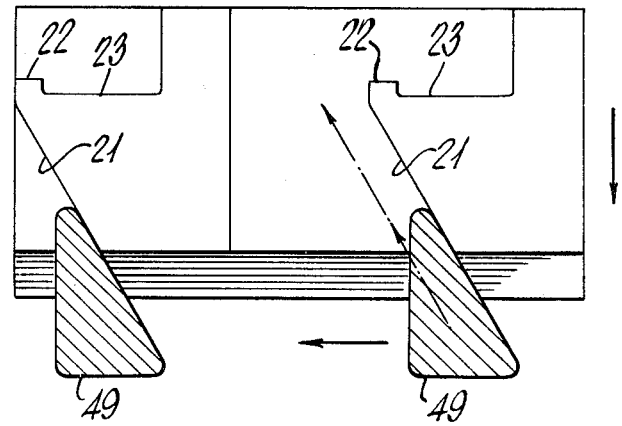
FIGS. 7 and 8 illustrate schematically the interaction of the locking cams and tie plate passageways in securing the upper tie plate.
Figure 8:
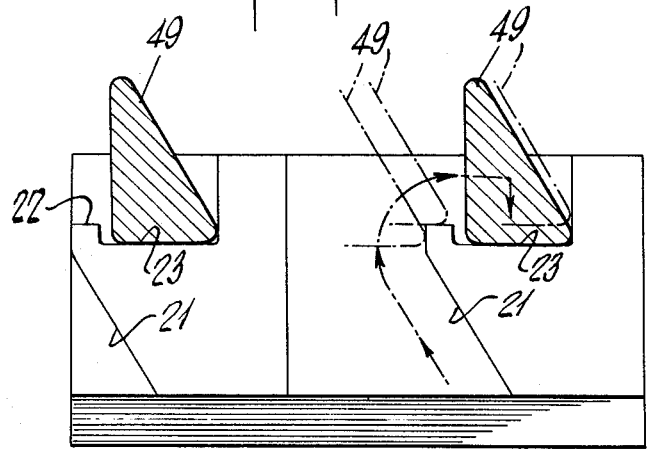

The relative movement of the cams 49 versus the tie plate passageways is shown schematically in FIGS. 7 and 8. As the tie plate is moved downward the inclined plane 21 forces the cams 49 to move to the left, which will rotate locking sleeve 35 on which cam 49 is disposed against the resistance of torsion spring 34. Once the cam 49 has cleared projection 22, the torsion spring 34 which has resisted the movement will have an opportunity to return to its relaxed position and move the cam to the right, past the projection 22 and into the seat 23, thus preventing the tie rod from moving. When all eight tie rods have been locked in this fashion, the bundle is completely assembled and will resist disassembly.

The bundle may be disassembled by the reverse procedure, that is moving the tie plate downward until the cams 49 can clear the projections 22. Then the cam device may be rotated into the passageway adjacent to the projection by means of a special removal tool and locked in that position. Once this has been done for each of the tie rods, the tie plate may be removed by lifting upward.

The above description covers the preferred embodiment of the present invention for assembling and locking in place a group of fuel rods constituting a nuclear reactor fuel bundle. The mechanical features may be varied from those disclosed herein without departing essentially from the spirit of the present invention which is covered by the scope of the claims which follow.

What is claimed is:

1. In a nuclear power reactor fuel bundle having tie rods for securing a pair of spring-biased fuel rod mounting upper and lower tie plates in assembled position, the improvement which comprises:
   a. a locking means attached to the end of each of said tie rods which engages said upper tie plate and moveable relative to said tie rod and an integral seat means within an opening in the upper one of said tie plates and facing away from said fuel rods for receiving said locking means and thereby locking said tie rods into said plates against the separating force of said fuel rod springs, said locking means comprising a cylindrical member coaxially moveable relative to said tie rod and having at least one cam means projecting radially outward from the surface of said cylindrical member;
   b. cam operator means disposed within said opening in said upper tie plate for rotating said cylindrical member by coacting with said cam means when said tie rod is moved through said opening in the upper tie plate until said locking means is above said seat means; and
   c. spring means for urging said locking means into locking engagement with said integral seat means in said upper tie plate after said locking means is above said seat means and thereby securing said tie rods to said tie plate, said spring means comprising a torsion spring attached at one end to said tie rod and at its opposite end to said cylindrical member whereby said torsion spring resists rotation of said cylindrical member relative to said tie rod.

2. A nuclear power reactor fuel bundle comprising:
   a. upper and lower tie plates having openings therein for receiving members positioned therebetween;
   b. fuel rods comprising hollow tubular members having both ends inserted into said openings in said tie plates;
   c. spring means associated with each of said fuel rods for contacting the upper tie plate whereby said upper tie plate is urged away from the bottom tie plate by compression of said spring;
   d. tie rods disposed between said tie plates and secured at one end to said bottom tie plate, the other end of said tie rods having a coaxially mounted locking assembly adjustably secured at one end to said tie rod and a moveable end interconnected to said fixed end by a torsion spring and rotatable relative to said tie rod and said secured end as restrained by said torsion spring, said locking assembly having at least one cam means mounted on said rotatable end and a cam means mounted on said rotatable end and a cam operator means disposed within the opening in said upper tie plate for rotating said rotatable end relative to said secured end against the resistance of said torsion spring;
   e. a cam seat means disposed within said opening in the upper tie plate which receives said tie rod, said cam seat disposed on the face of said upper tie plate opposite said fuel rods and relative to said cam operator means so as to receive said cam means after rotation by said cam operator means until said cam means is positioned to enter said seat and is urged into said seat by said torsion spring and thereby to restrain said upper tie plate against the urging of said spring means.

3. The fuel bundle of claim 2 wherein two cams are mounted on said locking assembly on opposite sides thereof.

4. The fuel bundle of claim 2 further comprising a locking projection adjacent said cam seat whereby said cam means may be prevented from reentering inclined said passageway until said tie plate is moved in a direction opposite the urging of said spring means.

5. The fuel bundle of claim 3 wherein said locking assembly comprises an anti-rotation projection disposed between said cams so as to engage a corresponding opening in said tie plate and thereby prevent said tie rod from rotating once said cams engage their respective seats.

6. The fuel bundle of claim 2 wherein said locking assembly is secured to said tie rod by a nut and a crimping sleeve.

* * * * *